Dec. 12, 1961
A. H. NAGEL
3,012,894
COMBINED FROZEN FOOD PACKAGE AND COOKING CONTAINER
Filed Dec. 3, 1957
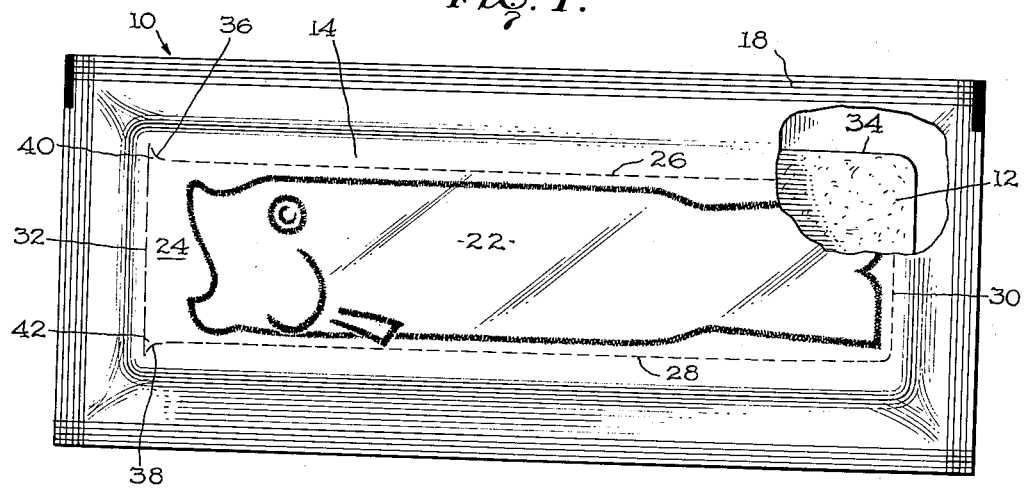
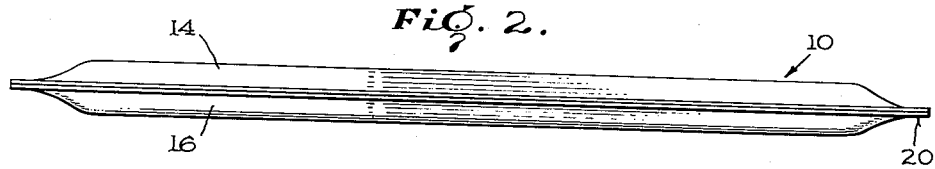
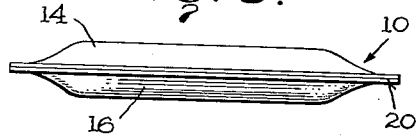
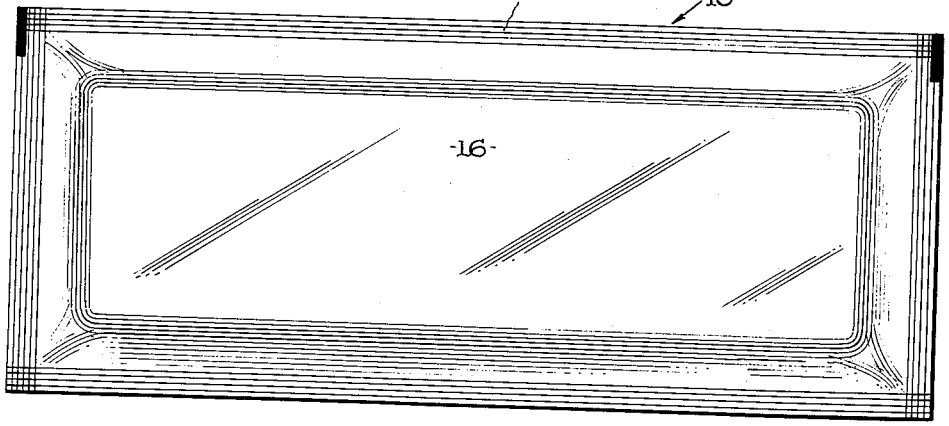
INVENTOR
Albert H. Nagel
BY Frederick F. Mack and
Michael J. Quillinan
ATTORNEYS

United States Patent Office 3,012,894
Patented Dec. 12, 1961

3,012,894
COMBINED FROZEN FOOD PACKAGE AND COOKING CONTAINER
Albert H. Nagel, Albion, N.Y., assignor to General Foods Corporation, White Plains, N.Y., a corporation of Delaware
Filed Dec. 3, 1957, Ser. No. 700,327
3 Claims. (Cl. 99—192)

This invention relates to a package of frozen perishable food.

In the marketing of frozen food products such as fillets of fish in the form of blocks a need exists for a convenient package whereby the block of frozen food can be marketed in a convenient foil envelope or pouch which could also serve as a pan in which to bake or broil or otherwise cook the frozen food. In this way fish fillets, buttered and seasoned to suit taste, for example, and wrapped in foil can simply be placed into an oven and cooked in its own foil wrap. This foil wrap should be attractively reinforced by being glued to paper which is located on the inside of the pouch. In order that the fish fillet or other frozen food product be properly broiled or baked a tear strip should be located in the upper regions of the pouch so that after the pouch has served its function in containing the food product it can be opened by tearing off the top of the foil pouch and thereby provide a foil pan in which to bake or broil.

In manufacturing this type of a food commodity it is highly desirable that the foil pouch be fabricated by heat sealing the borders of superposed sheets of packaging material, each sheet being composed of paper foil; e.g., aluminum foil, laminated to paper by glue. In fabricating an envelope or package from such material it is necessary to employ some thermoplastic resin such as polyethylene which is coated on the paper and serves as a heat-activated sealing composition; two sheets of the packaging material are usually brought together so that the paper plies and their coatings are opposite one another; these sheets are eventually sealed together under heat and pressure by suitable means such as heat sealing and clamping jaws.

Unfortunately, while such a foil envelope or pouch is not only attractive but comparatively inexpensive in the packaging of frozen fillets, the laminated sheet material does not tear easily along perforated lines of weakness provided in one of the sheets to define a tear strip. This difficulty is quite objectionable when a frozen fillet containing natural juices and flavoring materials like butter are incorporated into the pouch; for in tearing the pouch to form it into a pan in which to bake or broil the fillet the torn edges of the pouch should overlap the food product and thereby contain the flavorful juices and liquids which are freed during cooking; if the pouch tears unevenly it will not serve to contain these juices and liquids. In the case of fish fillets, for example, it is desirable that the fish block be sauteed in butter; a foil pouch which is torn unevenly prior to cooking will not contain the butter and other liquids within the pouch so that its usefulness as a baking pan is limited.

Attempts to design a tear strip which tears evenly have indicated that a thermoplastic resin such as polyethylene coating the paper ply in the paper foil, by virtue of its gumminess and plasticity, causes the paper foil to tear in an uncontrollable manner such that it will not follow the line of perforation employed to define the tear strip. The initial formation of this tear strip is an important part of the operation of tearing the foil pouch. Experience has indicated that if the tearing tab defined by a line of perforation in the metal foil is round, for instance, the paper will tear in an unpredictable manner and in most cases will not follow the line of perforation provided for defining it; instead of following a rounded line of perforation the paper foil will usually tear along lines tangential to the rounded line of induced weakness; this is of course unsatisfactory. Likewise, in the case of corners defined by lines of perforation it appears that the tearing stresses and lines of strain emanate radially in various directions from the point of intersection of the lines of perforation.

A package of frozen perishable food adapted for cooking the frozen food product in foil has now been invented which satisfies all of the foregoing product requirements including the feature of a container which can be readily torn by the housewife to provide an acceptable pan for cooking.

The invention will be best described and more fully understood by reference to the accompanying drawings wherein:

FIGURE 1 is a plan view of the package of the present invention; and

FIGURES 2, 3 and 4 side, end and bottom views of the package in FIGURE 1.

The package of the present invention comprises a foil pouch generally designated as 10 having inserted therein a block of frozen food such as a fish fillet having butter and seasoning incorporated therein and generally designated as 12. The foil pouch comprises an upper foil paper sheet 14 and a lower foil paper sheet 16; each sheet consists of a ply of aluminum foil and a paper ply laminated thereto by means of glue. The exposed face of each paper ply is coated with an extrused thermoplastic heat-activated sealing composition such as polyethylene, polyisobutylene, or other similar resin polymer or blends thereof. The upper and lower foil paper sheets are juxtaposed, crimped as at 18 and heat sealed at their borders to provide lapped border portions generally designated as 20.

Defined in the upper ply 14 is a tear strip generally shown as 22 and having a tab portion located at 24. The tear strip 22 is defined by a pair of spaced longitudinal parallel lines of perforation 26 and 28 and a pair of transverse lines of perforation 30 and 32 extending through sheet 14. The outline of the tear strip and tear tab is adapted to provide torn free edges of a foil pan located within the perimeter 34 of the fish block or other frozen product.

The tear tab 24 is defined by the straight transverse line of perforation 32 which is operably connected with the longitudinal lines of perforation 26 and 28 by a pair diverging cut lines 36 and 38. It will be noted that the longitudinal lines of perforation 26 and 28 are separated by a distance less than the length of the straight transverse line of perforation 32 and extend in a direction generally normal thereto. The lines of perforation 36 and 38 communicate with the terminals of the longitudinal lines of perforation 26 and 28 respectively and diverge outwardly in the direction of the terminals of transverse line of perforation 32 but terminate just short thereof to provide a small uncut foil and paper area adjacent the terminals of line of perforation 32.

By virtue of the acute angles defined by the lines of perforation forming the tear tab 24 the tab portion can be pulled upwardly and in the process will tear the aforesaid uncut foil and paper portions between lines 32, 36 and 38. The tip portions 40 and 42 formed in the process of tearing serve to localize the shearing stress and communicate them to the longitudinal lines of perforation 26 and 28. The tear tab thus formed offers to the housewife the opportunity to tear the portion 22 in a controllable manner along the lines of weakness induced and defined in the upper sheet of foil paper so that the torn edges resulting along lines 26, 28 and 30 as well as line 32 will serve to contain the liquefied juices and flavoring materials incorporated into the frozen food product by virtue of the fact that these torn edges are within the perimeter of the block of frozen food and project above the level of the frozen food. So uniform is the tearing effect that the gumminess and plasticity of the thermoplastic resin coating the paper ply of the foil paper does not impede the ability to tear evenly along the lines 26, 28 and 30.

While the present invention has been described with particular reference to specific examples, it is not to be limited thereby, but reference is to be had to the appended claims for a definition of its scope.

What is claimed is:

1. A package of frozen perishable food comprising a container and a frozen food product stored and adapted to be cooked therein, said container comprising flexible upper and lower sheets of paper-metal foil lapped at their border portions, the inner ply in each of said sheets being paper coated with a thermoplastic polyethylene resin and the sheets being joined at their border portions by said resin, said resin being sufficiently stable and adhesive at cooking temperatures as to preserve the junction of said sheets at said border portions upon exposure of the container to cooking temperatures, the upper sheet having a tear strip defined by lines of perforation extending therethrough, each line of perforation consisting of aligned perforations separated by uncut portions of paper-metal foil, the outline of said tear strip being located within the borders of said food product, a tab portion in said tear strip defined by a first straight line of perforation, a pair of parallel lines of perforation normal to said straight line and spaced from one another by a distance less than the length of said first straight line, and lines of perforation diverging outwardly from the terminals of said parallel lines in the direction of the terminals of said first straight line and terminating just short of said first straight line.

2. A package of frozen perishable food comprising a container and a frozen food product stored therein and adapted to be cooked therein, said container comprising flexible rectangularly shaped upper and lower sheets of paper-metal foil lapped at their border portions; each said sheet comprising an outer metal foil ply, an inner paper ply, a layer of adhesive between said plies, and a layer of heat-activated thermoplastic sealing agent on the inner side of the paper ply which is thermostable at cooking temperatures and below; said sheets being joined at their border portions at least partly by the aid of said agent and enclosing therebetween said food product; the upper sheet of paper-metal foil having a rectangularly shaded tear strip therein of smaller size than said sheet and defined by lines of perforation extending therethrough, each said line consisting of aligned perforations separated by uncut portions of paper-metal foil, said tear strip being of smaller size than said food product such that the outline of said tear strip is located within the borders of said food product; a tab portion at one end of said tear strip bounded by a transverse line of perforation of a length greater than the width of the balance of the tear strip, said tab portion on opposed sides thereof being connected to said balance of the tear strip through a pair of oppositely disposed pointed tip portions, said tip portions being partly defined by lines of perforation which diverge outwardly from said balance of the tear strip toward the terminals of said transverse line and which terminate just short of said terminals; and said upper sheet of the container, after removal of the tear strip to form an opening therein, having marginal portions extending completely around said opening and overlapping the borders of the food product, thereby aiding to retain cooking juices in the container during the use of the latter as a cooking vessel for the food product.

3. A package of frozen perishable food comprising a container and a frozen food product stored and adapted to be cooked therein, said container comprising flexible, upper and lower sheets of laminated paper-metal foil lapped at their border portions; said sheets being joined at their border portions and enclosing therebetween said food product, said joined border portions preserving the structure of the container upon exposure of the latter to cooking temperatures; the upper sheet of paper-metal foil having a tear strip therein of smaller size than said sheet and defined by lines of perforation, said tear strip also being of smaller size than said food product such that the outline of said tear strip is located within the outline of said food product; a tab portion at one end of said tear strip having a greater width than that of the balance of the tear strip, said tab portion being connected to said balance of the tear strip through a pair of oppositely disposed pointed tip portions, the line of perforation defining each said tip portion terminating just short of the line bounding said tab portion; and said upper sheet of the container, after removal of the tear strip to form an opening therein, having marginal portions extending completely around said opening and overlapping the borders of the food product.

References Cited in the file of this patent

UNITED STATES PATENTS

| | | |
|---|---|---|
| 2,242,711 | Oliver | May 20, 1941 |
| 2,360,415 | Gilbert | Oct. 17, 1944 |
| 2,400,390 | Clunan | May 14, 1946 |
| 2,777,601 | Cheeley | Jan. 15, 1957 |
| 2,951,765 | Robson | Sept. 6, 1960 |

OTHER REFERENCES

"Food Engineering," June 1951, page 109.
"Food Packer," November 1956, page 40.